(12) United States Patent
Betts-LaCroix (10) Patent No.: US 6,690,585 B2
(45) Date of Patent: Feb. 10, 2004

(54) BI-DIRECTIONAL DC POWER CONVERSION SYSTEM

(75) Inventor: Jonathan Betts-LaCroix, Chatsworth, CA (US)

(73) Assignee: OQO, Inc., San Francisco, CA (US)

( * ) Notice: Subject to any disclaimer, the term of this patent is extended or adjusted under 35 U.S.C. 154(b) by 0 days.

(21) Appl. No.: 10/230,812

(22) Filed: Aug. 29, 2002

(65) Prior Publication Data

US 2003/0043597 A1 Mar. 6, 2003

Related U.S. Application Data (60) Provisional application No. 60/315,941, filed on Aug. 29, 2001.

(51) Int. Cl.[7] .............................................. H02M 7/00
(52) U.S. Cl. ............................. 363/16; 363/71; 363/97
(58) Field of Search ............................. 363/16, 65, 71, 363/97

(56) References Cited

U.S. PATENT DOCUMENTS

| | | |
|---|---|---|
| 4,692,671 A | 9/1987 | Dishner et al. |
| 4,695,776 A | 9/1987 | Dishner et al. |
| 4,736,151 A | 4/1988 | Dishner |
| 4,801,859 A | 1/1989 | Dishner |
| 5,015,941 A | 5/1991 | Dhyanchand |
| 5,404,092 A | 4/1995 | Gegner |
| 5,440,179 A | 8/1995 | Severinsky |
| 5,978,236 A | 11/1999 | Faberman et al. |
| 5,999,424 A | 12/1999 | Schutten et al. |
| 6,069,804 A | 5/2000 | Ingman et al. |
| 6,166,927 A | 12/2000 | Farrington et al. |
| 6,211,657 B1 | 4/2001 | Goluszek |
| 6,219,266 B1 | 4/2001 | Pfauser |
| 6,243,275 B1 | 6/2001 | Ferencz |
| 6,243,277 B1 | 6/2001 | Sun et al. |
| 6,272,026 B1 | 8/2001 | Goder et al. |
| 6,304,059 B1 | 10/2001 | Chalasani et al. |
| 6,304,068 B1 | 10/2001 | Hui et al. |
| 6,304,461 B1 | 10/2001 | Walker |
| 6,320,358 B2 * | 11/2001 | Miller ........................ 323/222 |
| 6,344,985 B1 * | 2/2002 | Akerson ..................... 363/65 |
| 6,574,125 B2 * | 6/2003 | Matsukawa et al. .......... 363/71 |
| 2001/0030879 A1 | 10/2001 | Greenfeld et al. |
| 2002/0007463 A1 | 1/2002 | Fung |
| 2002/0008501 A1 | 1/2002 | Telefus et al. |

FOREIGN PATENT DOCUMENTS

| | | |
|---|---|---|
| JP | 08168240 | 6/1996 |
| JP | 08266039 | 10/1996 |
| JP | 11252919 | 9/1999 |
| JP | 2001157444 | 6/2001 |
| WO | WO87/03928 A1 | 7/1987 |
| WO | WO98/34314 A1 | 8/1998 |
| WO | WO99/52193 A1 | 10/1999 |
| WO | WO00/07287 A2 | 2/2000 |

* cited by examiner

*Primary Examiner*—Bao Q. Vu
(74) *Attorney, Agent, or Firm*—Robert Plotkin, P.C.

(57) ABSTRACT

A bi-directional DC-to-DC power converter is provided. The power converter has three modes of operation: (1) a step-down mode, in which the power converter converts power in a first direction (such as from a high-voltage power bus to a low-voltage power bus), and (2) a step-up mode, in which the power converter converts power in the opposite direction (such as from the low-voltage power bus to the high-voltage power bus), and (3) an off mode, in which no power is transferred. A single power converter may therefore be used to replace both a conventional step-down converter and a conventional step-up converter. The power converter may provide a battery charge-control functionality, and may be used to charge a battery that may, for example, provide a source of power to a component of an electrical device.

11 Claims, 11 Drawing Sheets

BI-DIRECTIONAL DC POWER CONVERSION SYSTEM

CROSS REFERENCE TO RELATED APPLICATIONS

This application claims priority from U.S. Provisional Patent Application Ser. No. 60/315,941, filed on Aug. 29, 2001, entitled "Bi-Directional DC Power Conversion System," which is hereby incorporated by reference.

BACKGROUND

1. Field of the Invention

The present invention relates to power conversion and, more particularly, to a bi-directional direct current power converter for providing power to and obtaining power from electrical components.

2. Related Art

Figure 1:
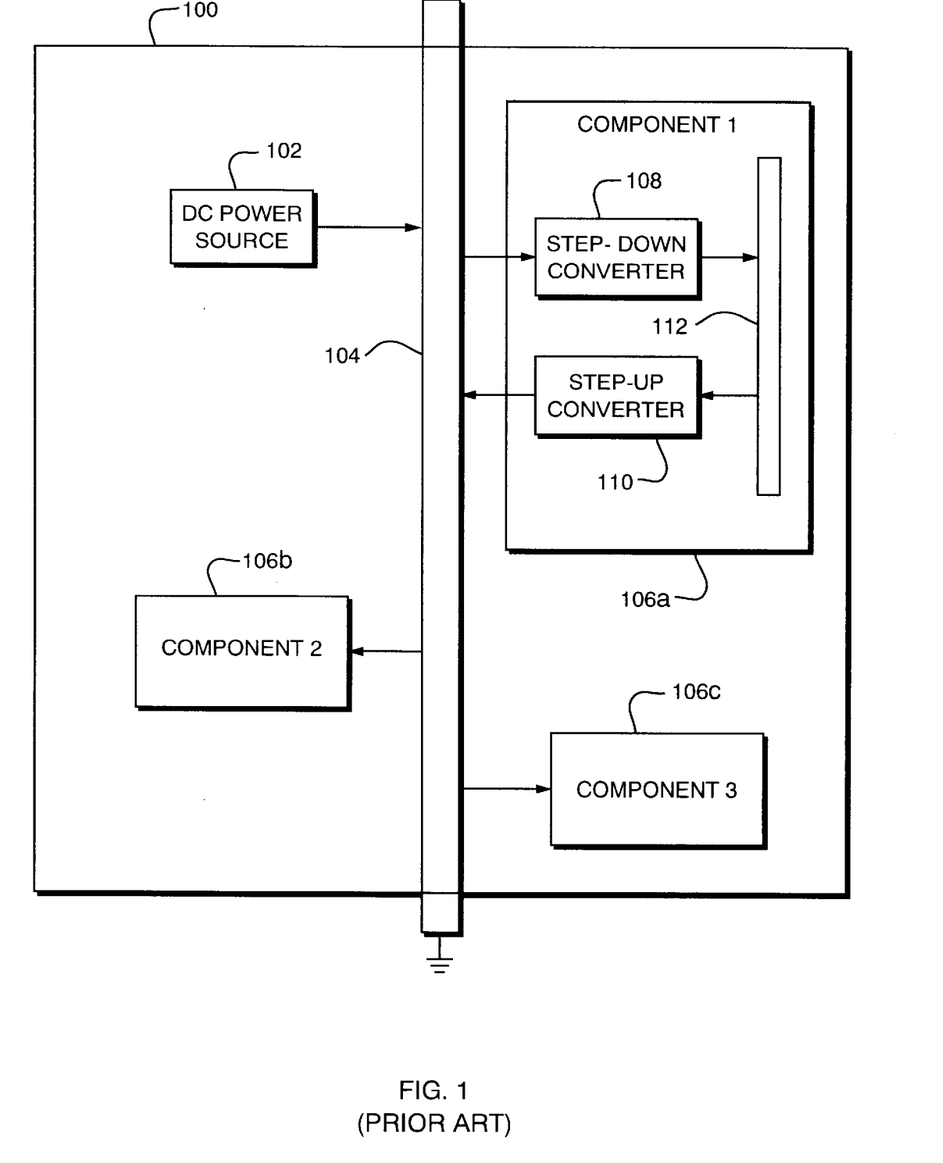
FIG. 1 is a block diagram of a prior art device including a conventional bi-directional DC power converter.

An electrical device may contain a variety of electrical components, each having different power requirements. Referring to FIG. 1, for example, consider an electrical device 100 powered by a DC power source 102. The device 100 contains a plurality of electrical components 106a–c coupled to and powered by a main DC power bus 104. Each of the components 106a–c may have different power requirements. The main power bus 104 has a higher voltage than that required to power any of the components 106a–c.

Each of the components 106a–c typically draws DC power from the main power bus 104 using an internal step-down converter. For example, component 106a includes a step-down converter 108, which draws power from the main power bus 104 and converts it into DC power at a lower voltage suitable for an internal power bus 112 of the component 106a. The internal power bus 112 powers additional sub-components (not shown) within the component 106a. Although only the step-down converter 108 and internal power bus 112 of the component 106a are shown in FIG. 1 for ease of illustration, it should be appreciated that each of the other components 106b–c typically contains a similar step-down converter and internal power bus to draw appropriate amounts of power from the main power bus 104.

The main power bus 104 shown in FIG. 1 is a bi-directional power bus which not only provides power to the components 106a–c but which also allows the components 106a–c to provide power to the main power bus 104. In this way, power drawn from one of the components 106a–c may be distributed to one or more of the other components 106a–c over the main power bus 104. For example, as shown in FIG. 1, component 106a may include a step-up converter 110 to draw power from the internal power bus 112, convert it into the higher voltage power of the main power bus 104, and provide the converted power to the main power bus 104. Although only the step-up converter 110 of the component 106a is shown in FIG. 1 for ease of illustration, it should be appreciated that each of the other components 106b–c may contain a similar step-up converter to provide power to the main power bus 104.

The kind of design just described typically requires each of the components 106a–c to include both a step-down converter for drawing power from the main power bus 104 and a step-up converter for providing power to the main power bus 104. What is needed is a single bi-directional DC-to-DC power converter that can be used by components in an electrical device to efficiently draw DC power from the device's main power bus and provide power to the device's main power bus.

SUMMARY

A bi-directional DC-to-DC power converter is provided. The power converter has three modes of operation: (1) a step-down mode, in which the power converter converts power in a first direction (such as from a high-voltage power bus to a low-voltage power bus), and (2) a step-up mode, in which the power converter converts power in the opposite direction (such as from the low-voltage power bus to the high-voltage power bus), and (3) an off mode, in which no power is transferred. A single power converter may therefore be used to replace both a conventional step-down converter and a conventional step-up converter. The power converter may provide a battery charge-control functionality, and may be used to charge a battery that may, for example, provide a source of power to a component of an electrical device.

Other features and advantages of various aspects and embodiments of the present invention will become apparent from the following description and from the claims.

DETAILED DESCRIPTION

According to one aspect of the present invention, a novel bi-directional DC-to-DC power converter is provided. The power converter has three modes of operation: (1) a step-down mode, in which the power converter converts power in a first direction (such as from a high-voltage power bus to a low-voltage power bus), and (2) a step-up mode, in which the power converter converts power in the opposite direction (such as from the low-voltage power bus to the high-voltage power bus), and (3) an off mode, in which no power is transferred. A single power converter may therefore be used to replace both a conventional step-down converter and a conventional step-up converter.

For example, in an electrical device having a main high-voltage power bus and a plurality of components each having a low-voltage internal power bus, power converters may be coupled between the device's main power bus and each of one or more of the components' internal power buses to convert power between the main power bus and the internal power buses, in either direction. When operating in step-down mode, the power converter converts power from the device's main power bus to the corresponding component's internal power bus; conversely, when operating in step-up mode, the power converter converts power from the component's internal power bus to the device's main power bus.

The power converter may easily be instructed to operate in either step-down mode or step-up mode at any particular point in time through use of a control signal provided to a control input of the power converter. For example, when the power converter is coupled between the main power bus of an electrical device and an internal power bus of a component of the electrical device, the component may instruct the power converter to operate in step-down mode (to provide power from the device's main power bus to the component's internal power bus) when the component requires power, or to operate in step-up mode (to provide power from the component's internal power bus to the device's main power bus) when the component has extra power to provide to the device's main power bus. When operating in step-down mode, the power converter may use power drawn from the device's main power bus to charge a battery coupled to the internal power bus, so that power stored in the battery may be provided to the corresponding component at a subsequent time.

While a system with a higher-voltage main power bus and lower-voltage internal busses is described herein, it should be appreciated that the voltage of the internal bus of each component may be either above or below that of the main power bus simply by orienting the component's bi-directional power converter accordingly.

More generally, the power converter converts power between a first power node and a second power node. The power converter includes a controller that controls the conversion of power between the first and second power nodes. The controller may be calibrated or otherwise configured with a desired output voltage level for each of the first and second power nodes.

The node from which power is being drawn at a particular point in time is referred to herein as the "input power node" and the node to which power is being provided is referred to as the "output power node." The controller monitors the voltage (referred to herein as the "output voltage") at the output power node. If the voltage at the output power node is less than its desired voltage, the controller increases the flow of current from the input power node to the output power node. If the voltage at the output power node is greater than its desired voltage, the controller decreases the flow of current from the input power node to the output power node. In this way, the controller maintains the desired voltage level at the output power node. Various embodiments of the controller and the processes which it may use to control power conversion are described in more detail below.

Figure 2:
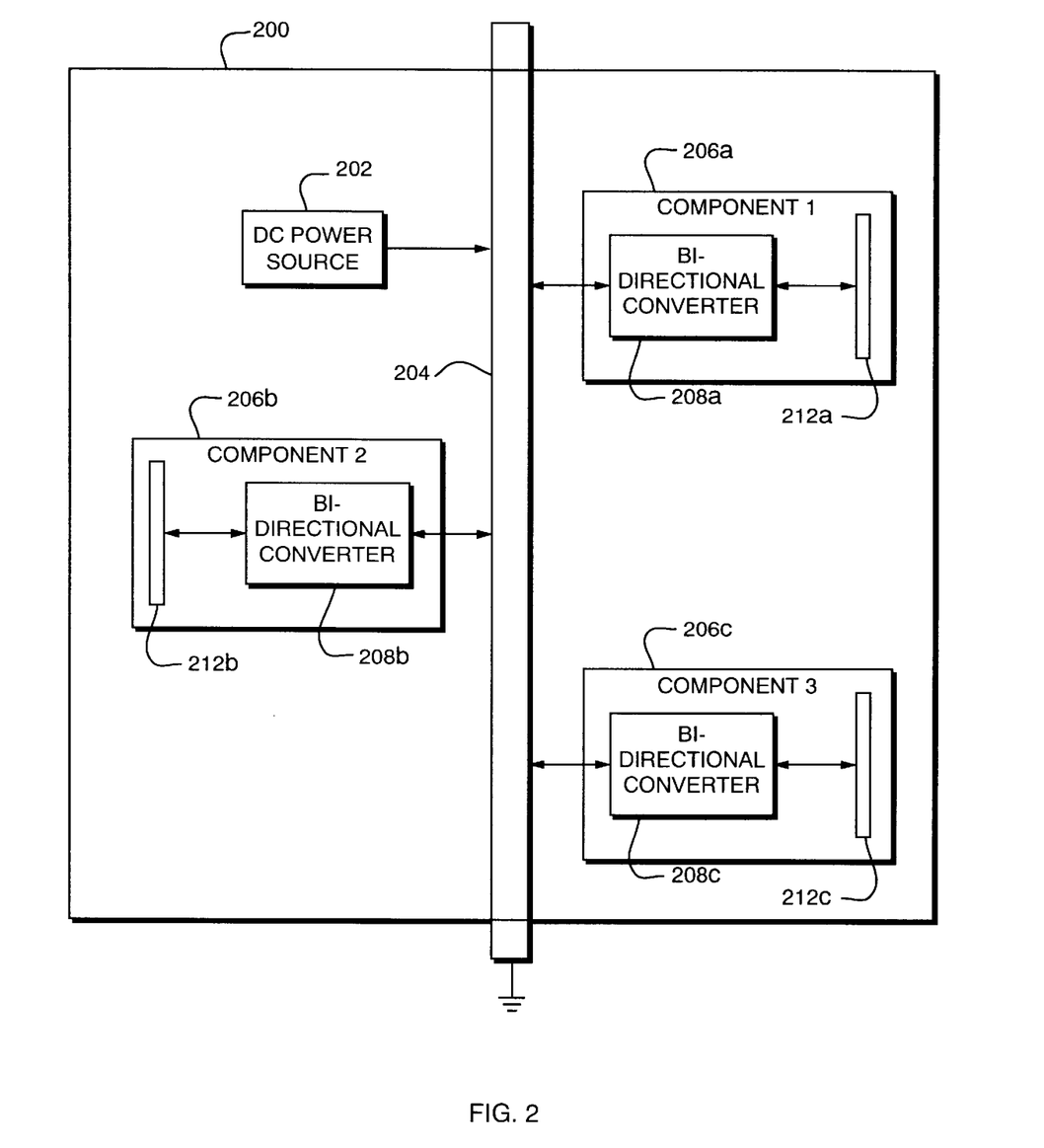
FIG. 2 is a block diagram of a device including a bi-directional DC power converter according to one embodiment of the present invention.

Referring to FIG. 2, a block diagram of a device 200 including a bi-directional DC power bus 204 (referred to herein as the "main power bus") according to one embodiment of the present invention is shown. The electrical device 200 contains a plurality of electrical components 206a–c, each of which may have different power requirements. Although three components 206a–c are shown for purposes of example, the device 200 may include any number of components.

Power is provided to the main power bus 204 by a DC power source 202, which may be any DC power source. DC power source 202 may obtain power from a power source (not shown) that is external to device 200. Such an external power source may be any external power source. Components 206a–c are coupled to main power bus 204, which has a higher voltage than that required by any of the components 206a–c. As described in more detail below, each of the components 206a–c may draw power from the main power bus 204 and/or provide power to the main power bus 204.

In one embodiment, components 206a–c include bi-directional DC power converters 208a–c, various embodiments of which are described in more detail below. For example, component 206a includes a bi-directional DC power converter 208a, which may operate in either one of three modes at any particular point in time: (1) step-down mode, in which the converter 208a draws power from the main power bus 204, converts it into DC power at a lower voltage suitable for an internal power bus 212a of the component 206a, and provides the converted power to the internal power bus 212a; and (2) step-up mode, in which the converter 208a draws power from the internal power bus 212a, converts it into DC power at a higher voltage suitable for the main power bus 204, and provides the converted power to the main power bus 204, and (3) off mode, in which no power is transferred. The internal power bus 212a powers additional sub-components (not shown) within the component 206a. Similarly, component 206b includes bi-directional converter 208b and internal power bus 212b, and component 206c includes bi-directional converter 208c and 212c for performing bi-directional power conversion in the manner just described.

It should be appreciated that although all of the components 206a–c of the device illustrated in FIG. 2 include a bi-directional power converter, this is not a limitation of the present invention. Rather, any number of the device's components may include bi-directional power converters. Therefore, it is not required that every one of the components 206a–c be capable of both drawing power from and providing power to the main power bus 206. Furthermore, it should be appreciated that, although systems with a larger number of components are shown in the examples, systems with as few as two components may benefit from the present invention, including but not limited to systems in which the two components are identical.

Although the power converters 208a–c are shown as being enclosed within the components 206a–c, respectively, this is merely an example and does not constitute a limitation of the present invention. More generally, each of the power converters 208a–c is coupled between the main power bus 204 and an internal power bus of one of the components 206a–c. For example, the converter 208a may be implemented as a separate device that is coupled between the main power bus 204 and the internal power bus 212a of component 206a, rather than as a sub-component of component 206a.

Recall that the components 106a–c of the prior art device 100 shown in FIG. 1 each contained both a step-down converter and a step-up converter. In contrast, each of the components 206a–c shown in FIG. 2 contains only a single bi-directional power converter. Various embodiments of the bi-directional converters 206a–c will now be described in more detail, whereby the features and advantages of such embodiments will become apparent.

Figure 3A:
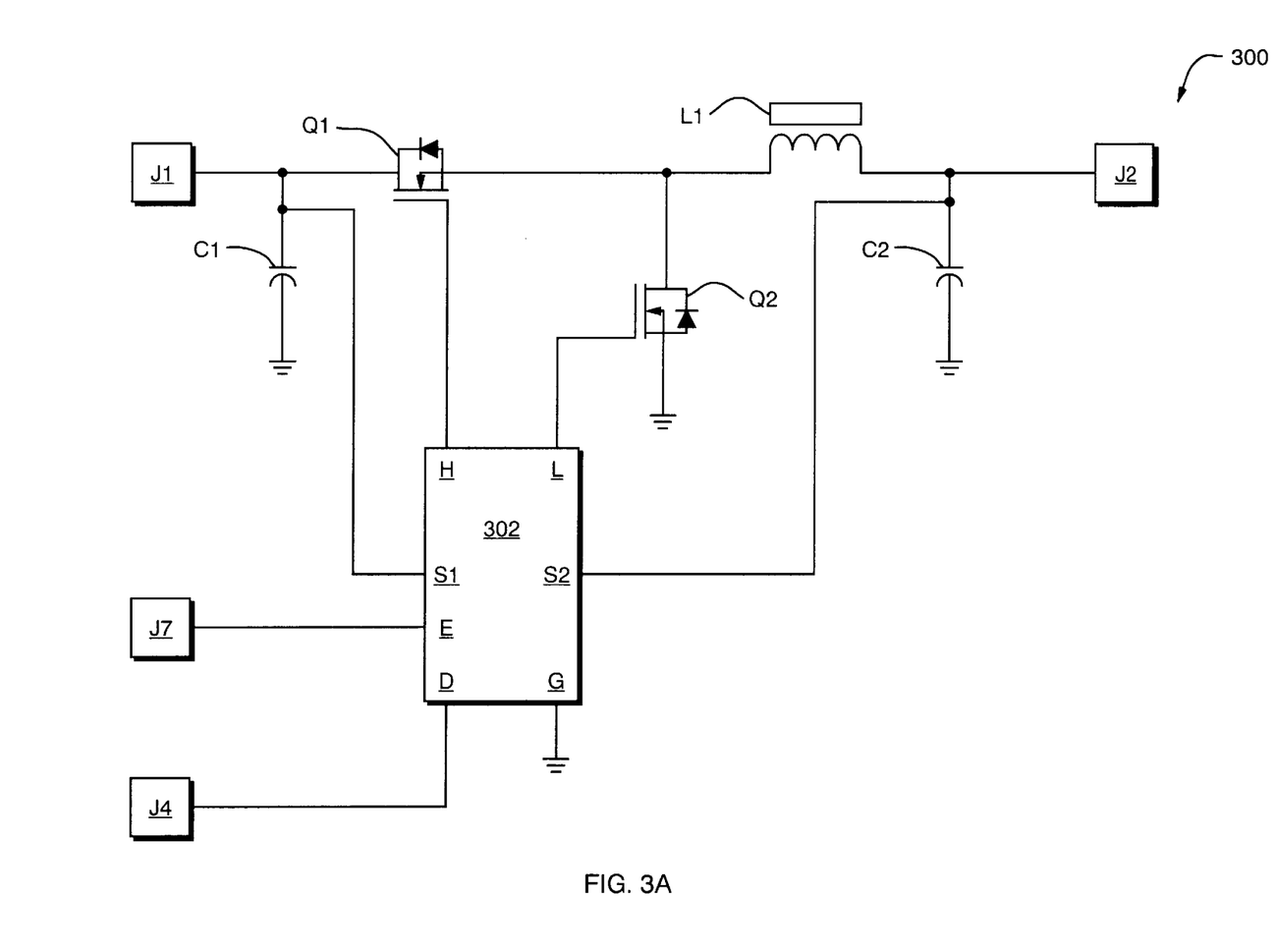
FIG. 3A is a circuit diagram of a single-phase bi-directional DC power converter according to one embodiment of the present invention.

Referring to FIG. 3A, a circuit diagram illustrating one embodiment of a bi-directional power converter 300 according to the present invention is shown. The bi-directional power converter 300 may, for example, be used to implement one or more of the bi-directional power converters 208a–c shown in FIG. 2.

The converter 300 has a first power node J1 which may, for example, be coupled to a high-voltage power bus, such as the main power bus 204 shown in FIG. 2. The converter 300 also has a second power node J2 which may, for example, be coupled to a low-voltage power bus, such as the internal power bus 212a of component 206a shown in FIG. 2. The converter 300 converts power between nodes J1 and J2. More specifically, the converter 300 has three modes of operation: a step-down mode, a step-up mode, and an off mode. When operating in step-down mode, the converter 300 operates similarly to a synchronous Buck converter and converts power from node J1 to node J2. When operating in step-up mode, the converter 300 operates similarly to a synchronous boost converter and converts power from node J2 to node J1. When in the off mode, no power is transferred.

The converter 300 includes a controller 302 that is programmed to perform a variety of functions described in more detail below. The converter 300 includes control nodes J4 and J7, which are coupled to control inputs D and E, respectively, of controller 302. The control signal provided at node J4 is used to instruct the controller 302 to operate in either step-down mode or step-up mode. The controller 302 monitors the control signal at control input D and switches to either step-down mode or step-up mode depending on the control signal. Any of a variety of input signals may be used; for example, a simple two-state signal may be used in which a high signal instructs the controller 302 to operate in step-down mode and a low signal instructs the controller 302 to operate in step-up mode. In a similar manner, the control signal provided at node J7 is used to instruct the controller 302 to be enabled or disabled; if the controller is disabled it is in the off mode, and no power is transferred between nodes J1 and J2.

Inputs S1 and S2 of controller 302 are sensing inputs that sense the voltages at nodes J1 and J2, respectively. As described in more detail below, the controller 302 uses the voltages sensed at nodes J1 and J2 to maintain the output voltage at its desired level.

Figure 4:
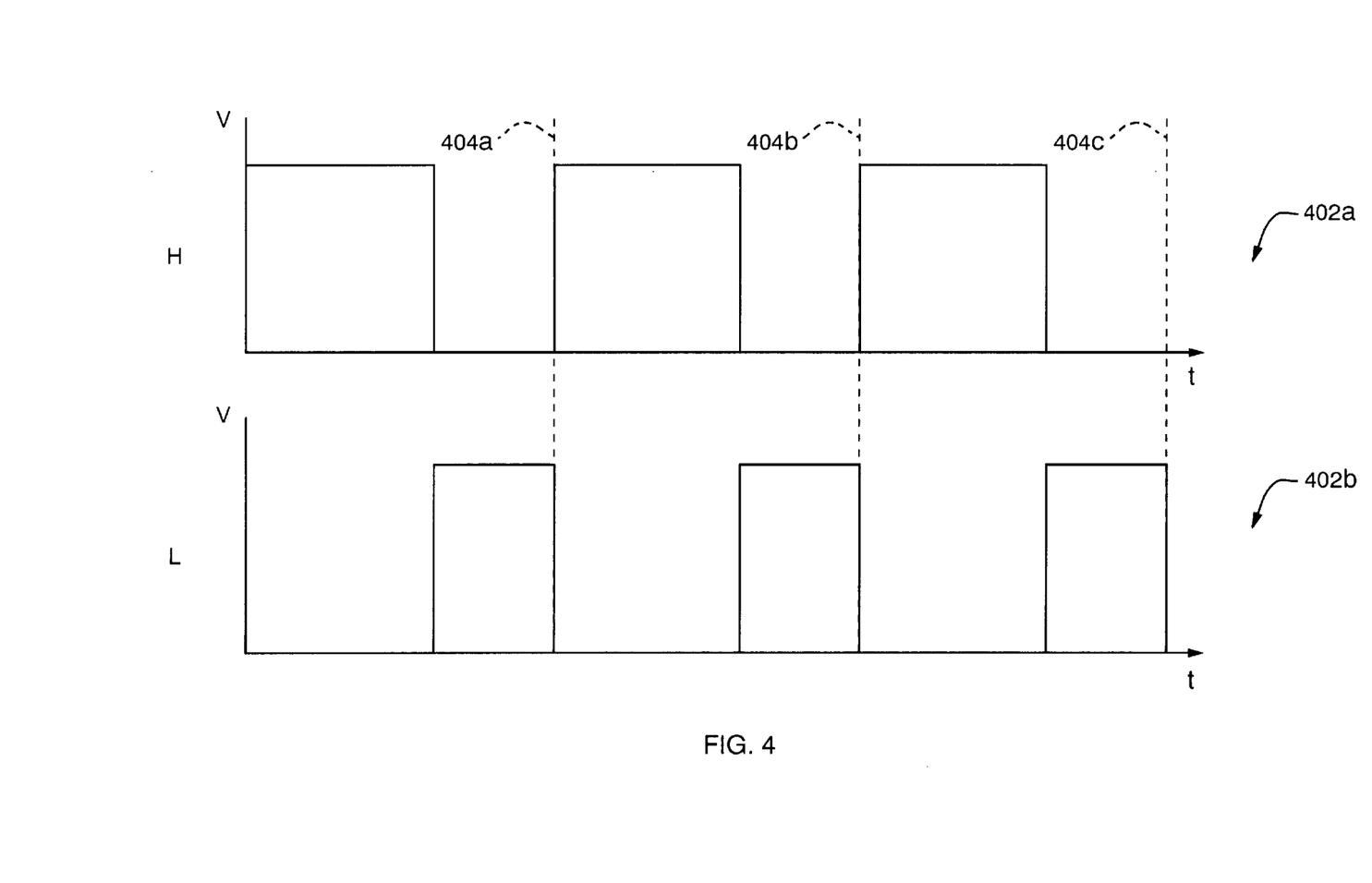
FIG. 4 is a graph of two signals used by a power converter controller to control power conversion according to one embodiment of the present invention.

The controller 302 continuously provides substantially out-of-phase signals at outputs H and L. In one embodiment, for example, the signals provided at outputs H and L are out-of-phase square waves. For example, referring to FIG. 4, graphs 402a–b are shown of the signals provided at the H and L outputs, respectively, in one embodiment of the present invention. Each of the graphs 402a–b plots voltage versus time. The dashed lines 404a–c indicate the boundaries of time intervals that are referred to herein as "power cycles." As shown in FIG. 4, the H and L signals are out-of-phase square waves. In this example, the H signal is high for approximately 66% of each power cycle and the L signal is high for approximately 33% of each power cycle. The ratio of the on-time of the H signal to the duration of the entire power cycle is referred to herein as the "duty cycle" of the controller 302. Therefore, the duty cycle of the controller 302 is approximately 66% when outputting the signals shown in FIG. 4. The controller 302 is capable of varying its duty cycle, thereby altering the relative amount of time during each power cycle for which the H and L signals are high.

It should be noted that, at low power conversion rates, the controller 302 may enter a "discontinuous" mode, wherein the sum of the on-time of the H signal plus the on-time of the L signal becomes less than the total duration of the power cycle.

Converter 300 also includes switches Q1 and Q2. Assertion of the H output causes switch Q1 to close, and assertion of the L output causes switch Q2 to close. Since the H and L signals are out-of-phase square waves, switch Q1 will be closed (on) when switch Q2 is open (off) during the operation of the controller 302. Similarly, switch Q2 will be closed (on) when switch Q1 is open (off) during operation of the controller 302. In other words, switches Q1 and Q2 will not both be closed at the same time.

Furthermore, since switches Q1 and Q2 are controlled by outputs H and L, respectively, during each power cycle switch Q1 will be closed while the H signal is high and switch Q2 will be closed while the L signal is high. Therefore, the ratio of the on-time of switch Q1 (the amount of time in each power cycle in which switch Q1 is closed) to the duration of the entire power cycle is equal to the duty cycle described above. Therefore, it should be appreciated that when reference is made in the description below to increasing or decreasing the duty cycle of the converter 300 or the controller 302, such increase or decrease may be effected by changing the on-times of the output H during each power cycle, thereby causing corresponding changes in the relative on-times of switches Q1 and Q2 during each power cycle.

In step-down mode, when Q1 closes, current from J1 and capacitor C1 flows through inductor L1, increasing the energy in L1, and also forcing current into C2 and out J2. When Q2 closes (and Q1 is open), stored energy in L1 forces current to continue to flow from L1 out J2, and stored energy in C2 causes current to flow from C2 out J2.

In step-up mode, when Q2 closes, current flows from J2 and C2 through L1 and Q2, increasing the energy in L1. During this period, current is flowing from C1 out J1, using stored energy from C1. When Q1 closes (and Q2 is open), stored energy in L1 forces current out J1 and also into C1, recharging C1.

The overall direction and amount of current flow between nodes J1 and J2 may therefore be regulated by varying the duty cycle of the controller 302. References herein to the duty cycle of the converter 300 should be understood to refer to the duty cycle of the controller 302. Similarly, references to the mode of operation of the converter 300 (e.g., step-down mode or step-up mode) should be understood to refer to the mode of operation of the controller 302.

When the converter 300 is operating in step-down mode, increasing the duty cycle of the controller 302 will tend to result in greater current flow, and therefore greater power delivery, from node J1 to node J2. Similarly, decreasing the duty cycle of the controller 302 in step-down mode will tend to result in less current flow, and therefore less power delivery, from node J1 to node J2.

Similarly, when the converter 300 is operating in step-up mode, decreasing the duty cycle of the controller 302 will tend to result in greater current flow, and therefore greater power delivery, from node J2 to node J1. Increasing the duty cycle of the controller 302 will tend to result in less current flow, and therefore less power delivery, from node J2 to node J1.

As will now be described in more detail, the duty cycle of the controller 302 may be varied to control both the direction of power conversion between the nodes J1 and J2 and the amount of power provided to the output node. The controller 302 may be pre-programmed or otherwise calibrated to maintain a desired high voltage at node J1 or to maintain a desired low voltage at node J2. The controller 302 may, for example, be calibrated to maintain a particular low voltage at node J2 to meet the particular power requirements of the component to which the converter 300 is coupled.

It should be noted that the duty cycle of the controller 302 may be controlled in ways other than that described above. For example, the controller 302 may be controlled using pulse-frequency modulation (PFM), in which the primary switch (Q1 in step-down mode, or Q2 in step-up mode) is made to have a fixed on-time and the controller 302 changes the duty cycle by varying the duration of the overall power cycle.

Figure 5A:
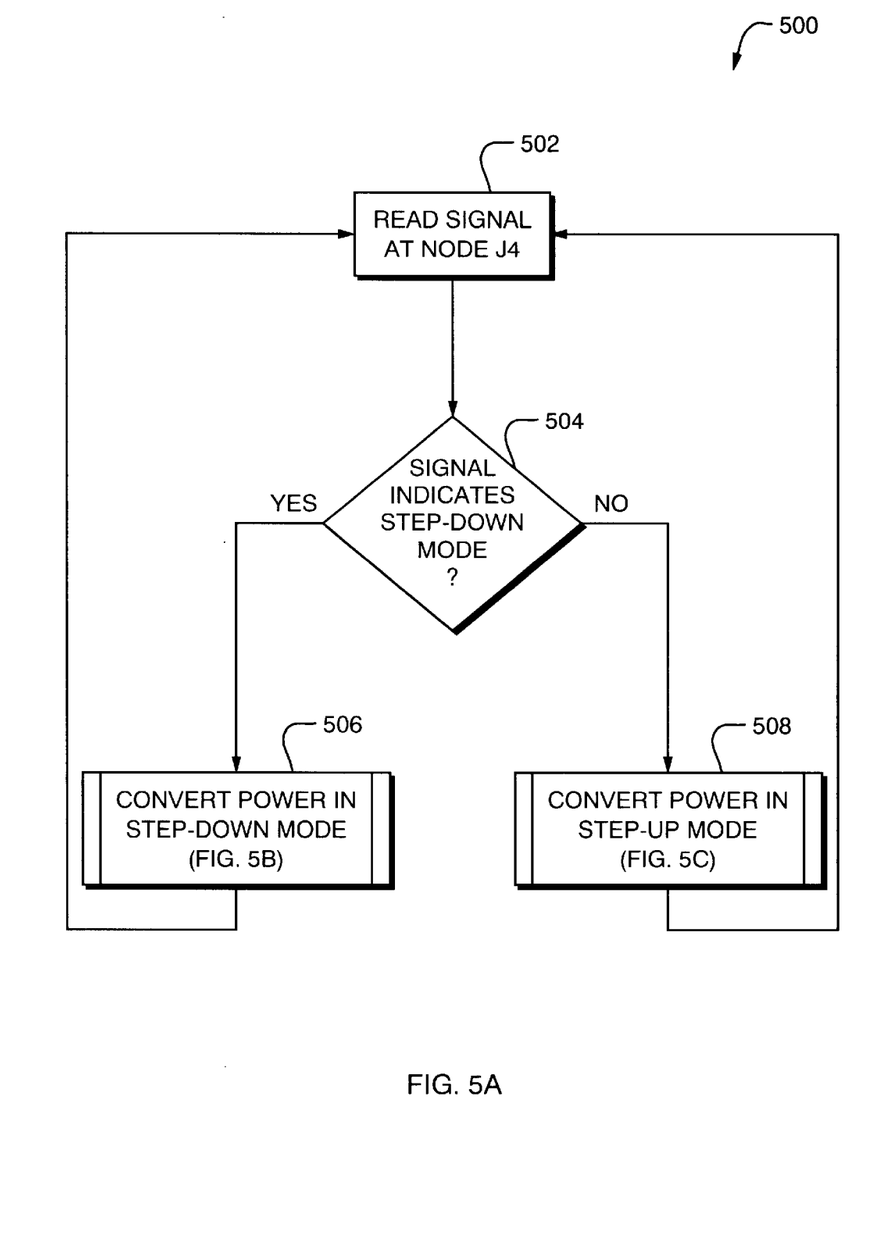
FIGS. 5A–5C are flow charts of processes used by a power converter controller to control power conversion according to one embodiment of the present invention.

Referring to FIG. 5A, a flow chart is shown of a process 500 that may be carried out by the controller 302 according to one embodiment of the present invention. The process 500 consists of a main loop, in which the controller 302 reads the control signal provided at node J4 (step 502) and determines whether the control signal indicates that the controller 302 should operate in step-down mode (step 504).

If the control signal indicates that the controller 302 should operate in step-down mode, the controller operates in step-down mode by executing a process shown and described in more detail below with respect to FIG. 5B (step 506). Otherwise, the controller operates in step-up mode by executing a process shown and described in more detail below with respect to FIG. 5C (step 508).

Figure 5B:
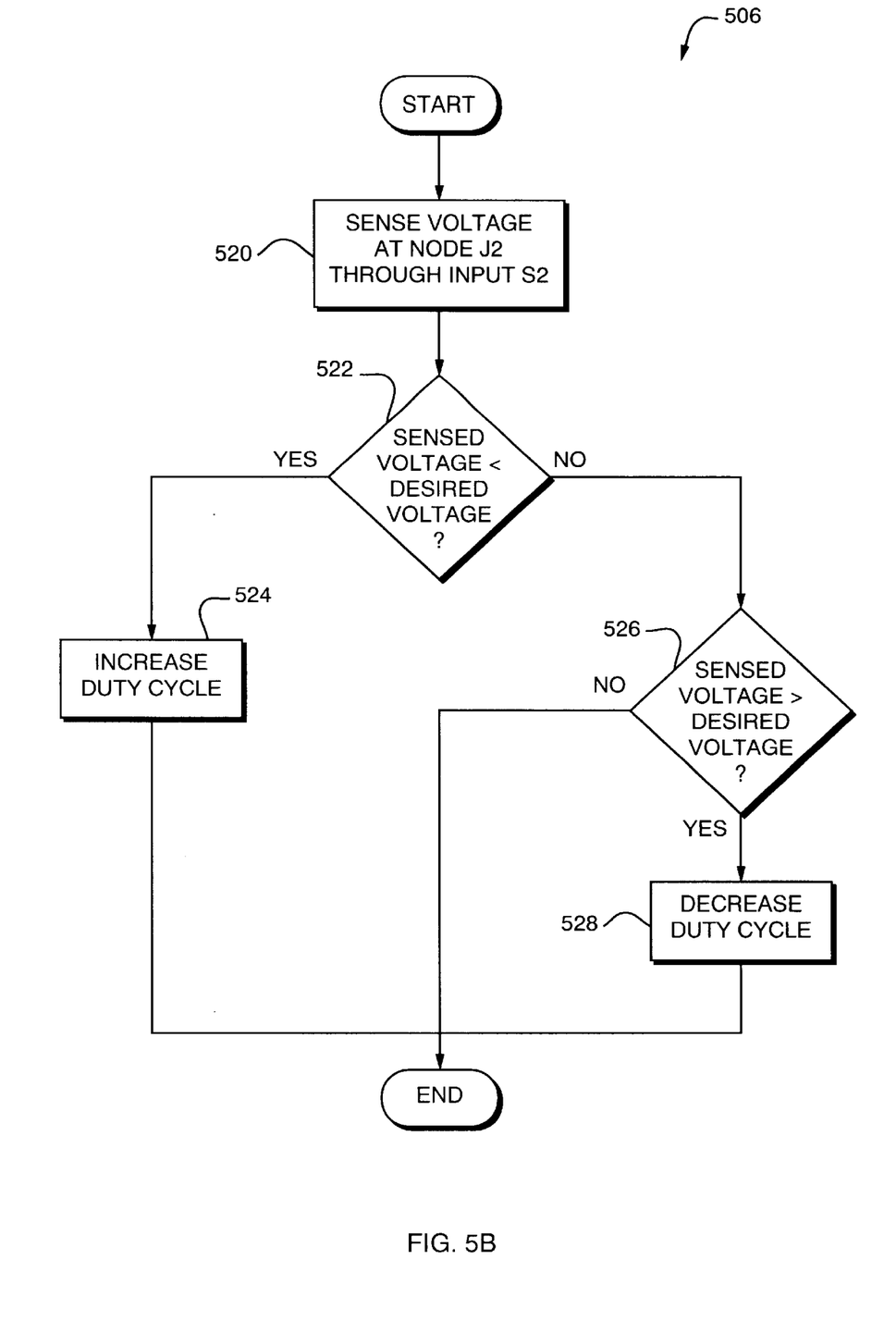

Referring to FIG. 5B, the controller 302 operates in step-down mode in one embodiment of the present invention as follows. The controller 302 senses the voltage at node J2 (which is equivalent to the voltage of capacitor C2) through the sense input S2 (step 520). As described above, the controller 302 may be calibrated or otherwise pre-configured with a desired voltage level for node J2. The controller 302 adjusts its duty cycle to maintain the desired voltage at node J2 as follows.

If the sensed voltage of node J2 is less than the desired voltage (step 522), the controller 302 increases its duty cycle (step 524). If the sensed voltage of node J2 is higher than the desired voltage (step 522), the controller 302 decreases its duty cycle (step 526). If the sensed voltage of node J2 is equal to the desired voltage (step 522), the controller does not modify its duty cycle. Control then returns to step 502 (FIG. 5A). By using the process shown in FIG. 5B to continuously increase and/or decrease the duty cycle of the controller 302 based on the voltage sensed at input S2, the voltage at node J2 may be brought to its desired level.

Figure 5C:
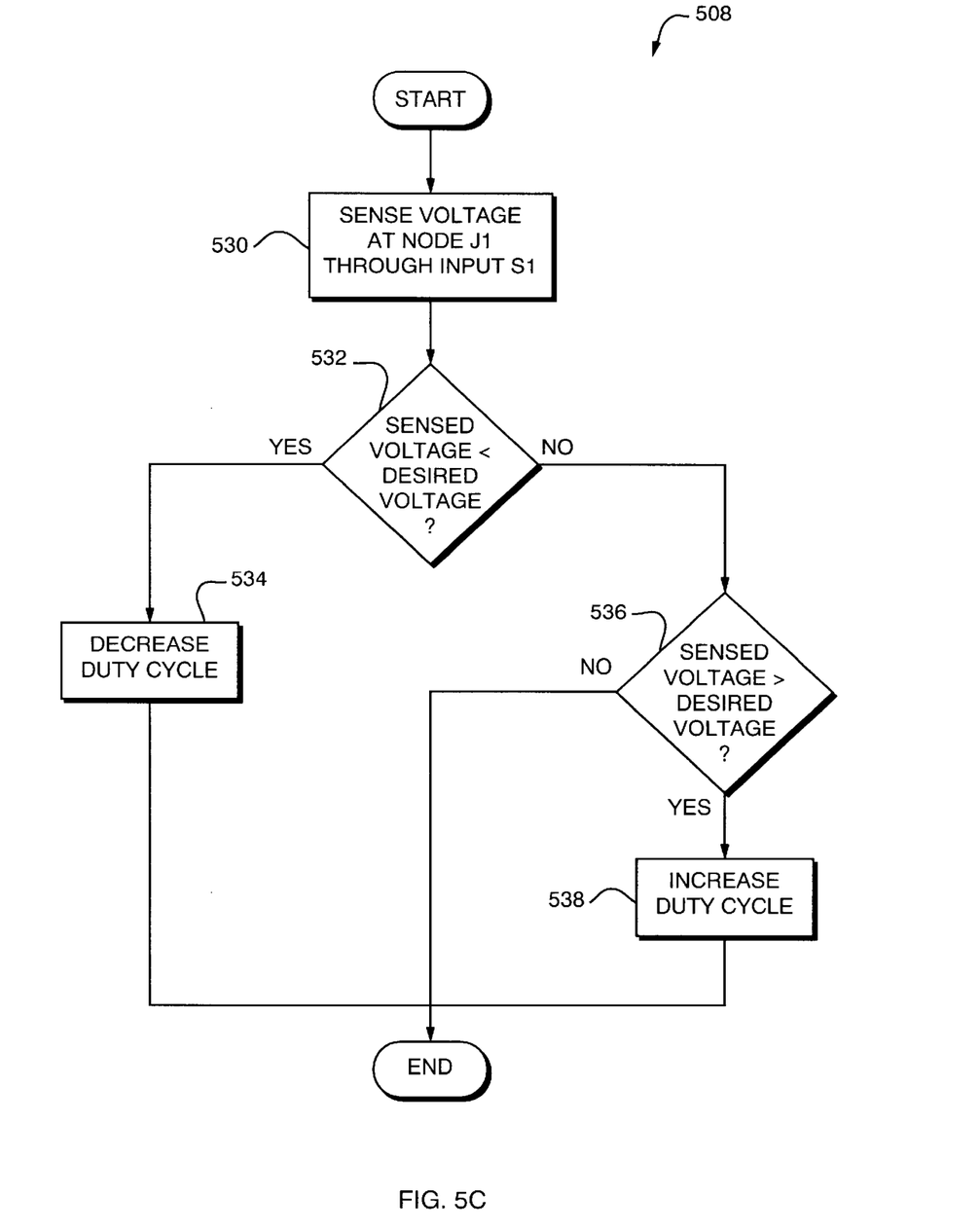

Referring to FIG. 5C, the controller 302 operates in step-up mode in one embodiment of the present invention as follows. The controller 302 senses the voltage at node J1 (which is equivalent to the voltage of capacitor C1) through the sense input S1 (step 530). As described above, the controller 302 may be calibrated or otherwise pre-configured with a desired voltage level for node J1. The controller 302 adjusts its duty cycle to maintain the desired voltage at node J1 as follows.

If the sensed voltage of node J1 is less than the desired voltage (step 532), the controller 302 decreases its duty cycle (step 534). If the sensed voltage of node J1 is higher than the desired voltage (step 532), the controller 302 increases its duty cycle (step 536). If the sensed voltage of node J1 is equal to the desired voltage (step 532), the controller does not modify its duty cycle. Control then returns to step 502 (FIG. 5A). By using the process shown in FIG. 5C to continuously increase and/or decrease the duty cycle of the controller 302 based on the voltage sensed at input S1, the voltage at node J1 may be brought to its desired level.

It should be noted that although the processes described above with respect to FIGS. 5B–5C have been described using flow charts with discrete steps for ease of illustration and explanation, in particular embodiments the controllers 302 may use a continuous, rather than discrete, process to maintain voltage at the desired levels.

Figure 3B:
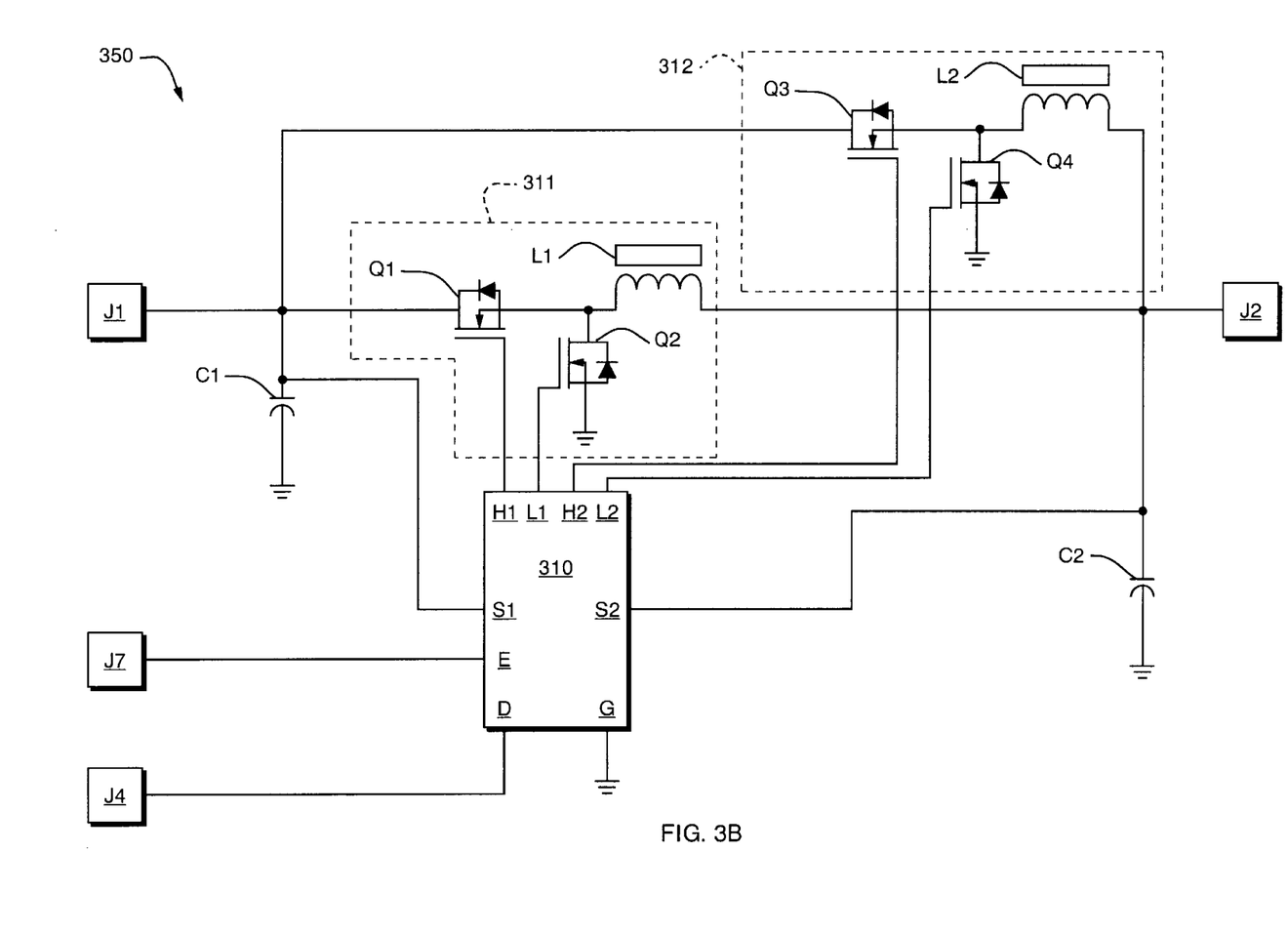
FIG. 3B is a circuit diagram of a multi-phase bi-directional DC power converter according to one embodiment of the present invention.

Referring to FIG. 3B, in another embodiment of the present invention, a multiphase bi-directional power converter 350 is provided. The converter 350 is composed of substantially the same components in substantially the same configuration as the single-phase converter 300 described above with respect to FIG. 3A, with the following differences. In the multiphase converter 350, a phase is defined as a configuration of two switches and an inductor, such that, for instance, the two transistors Q1, Q2 and inductor L1 of the power converter 300 constitute a phase. In the multiphase power converter 350, components Q1, Q2 and L1 form one phase 311 while additional components Q3, Q4 and L2 form an additional phase 312. Controller 310 includes two additional outputs H2 and L2, which drive two additional switches Q1 and Q2, respectively. While two phases are described in this embodiment, this is not a limitation of the present invention, and any number of additional phases could be used.

Operation of the multiphase converter 350 is the same as the single-phase converter 300, except that the additional phase 312 operates 180 degrees out-of-phase with the original phase 311. In the three-phase case, each phase may be 120 degrees out-of-phase with the next, in the four-phase case, 90 degrees, and so forth.

The multiphase embodiment shown in FIG. 3B affords several advantages in certain cases that offset its increased number of components and increased complexity of the controller 310. These advantages include, but are not limited to: decreasing the ripple current in the capacitors C1 and C2 thereby reducing the size and cost of these capacitors and also improving the quality of the output power, and decreasing current ripple at the input; and decreasing the size of each of the inductors, thereby allowing in certain cases, a lower minimum component height above, for example, a printed wiring board.

Figure 6:
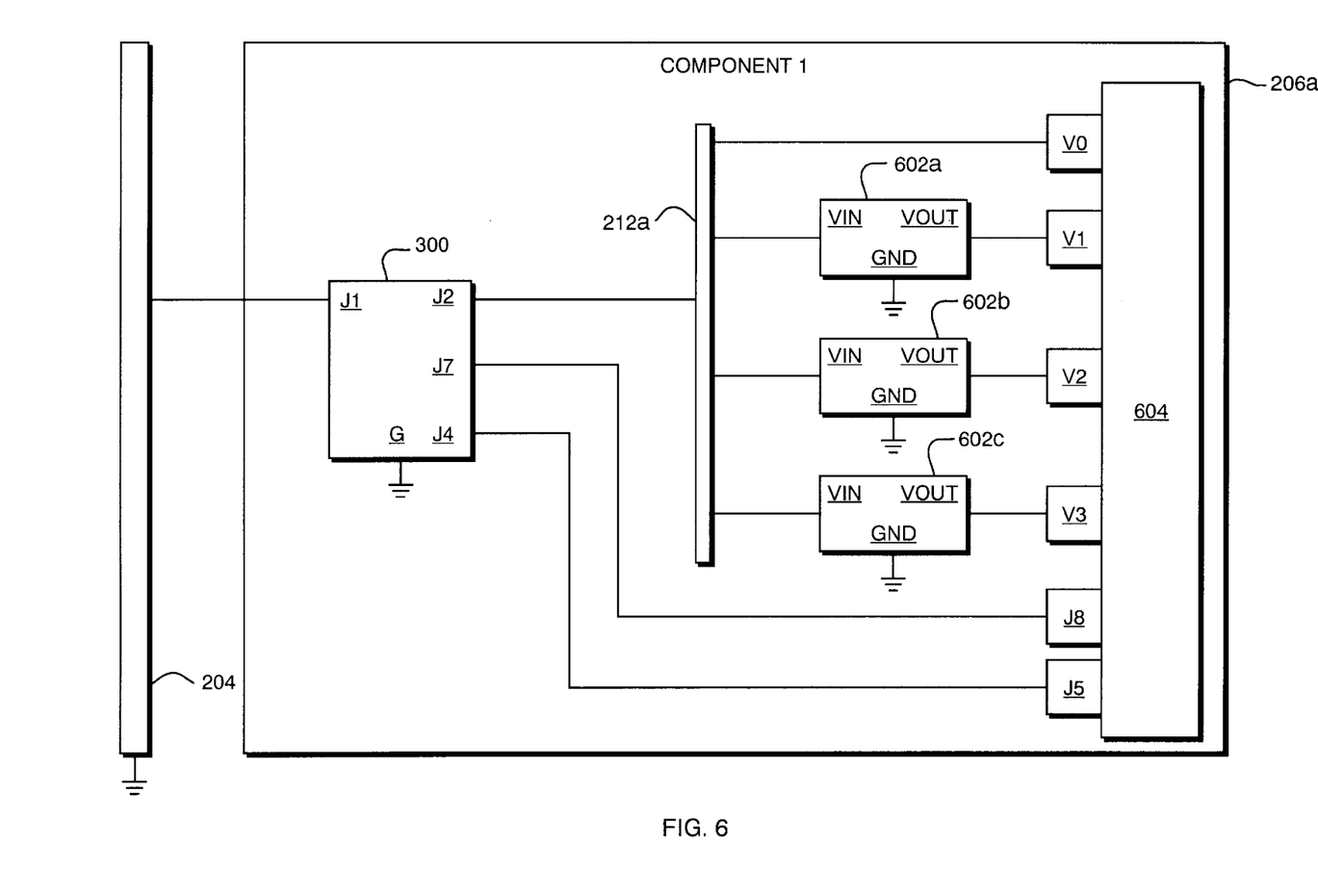
FIG. 6 is a block diagram of a device including a bi-directional power converter according to one embodiment of the present invention.

Referring to FIG. 6, an application of the power converter 300 is shown according to one embodiment of the present invention. As shown in FIG. 6, the power converter 300 is provided within the component 206a of the device 200 shown in FIG. 2. The converter 300 is shown in block form in FIG. 6 to illustrate how the converter 300 may be used in a particular application. Although only the component 206a is shown in FIG. 6, it should be appreciated that the power converter 300 may also be provided within the other components 206a–b of the device 200.

As shown in FIG. 6, first power node J1 of the power converter 300 is coupled to the high-voltage main power bus 204 of the device 200. Second power node J2 of the power converter 300 is coupled to the low-voltage internal power bus 212a of the component 206a–b. In this configuration, the power converter 300 may be used to perform bi-directional power conversion between the main power bus 204 and the internal power bus 212a.

The component 206a may include any number of voltage regulators that convert the voltage on the internal power bus 212a to the various voltages required by a system 604. In the present example, voltage regulators 602a–c draw power from the internal power bus 212a and provide power at various voltages to nodes V1, V2 and V3, respectively, of the system 604, while the internal power bus 212a is connected directly to node V0. In addition to its primary functions, the system 604 may perform control functions, including managing the operation of the voltage regulators 602a–c, and also controlling the bidirectional power converter 300. In the present example, a control output at node J5 of system 604 is used by the system 604 to send a "direction" signal to the control input J4 of the power converter 300 thereby instructing the power converter 300 to operate in either step-down mode (thereby providing power from the main power bus 204 to the internal power bus 212a) or in step-up mode (thereby providing power from the internal power bus 212a to the main power bus 204). The controller 604 may, for example, instruct the power converter 300 to operate in step-down mode when the component 206a is in need of additional power and to operate in step-up mode when the component 206a has power to provide to the main power bus 204. Also in the present example, an additional control output at node J8 of controller 604 is used by the controller 300 to send an "enable" signal to the control input J7 of the power converter 300, thereby controlling whether the power converter 300 is on, and thus capable of transferring power, or off, in which case the internal power bus 212a is electrically isolated from the main power bus 204. This off state may be used both to save power by not operating the power converter 300 in situations such as when the main power bus 204 is disconnected from the component 206a (which may perhaps then be carried as a portable computing device), and also to isolate the internal power bus 212a from the main power bus 204 for various reasons even while the main power bus 204 remains connected to the component 206a.

Figure 7A:
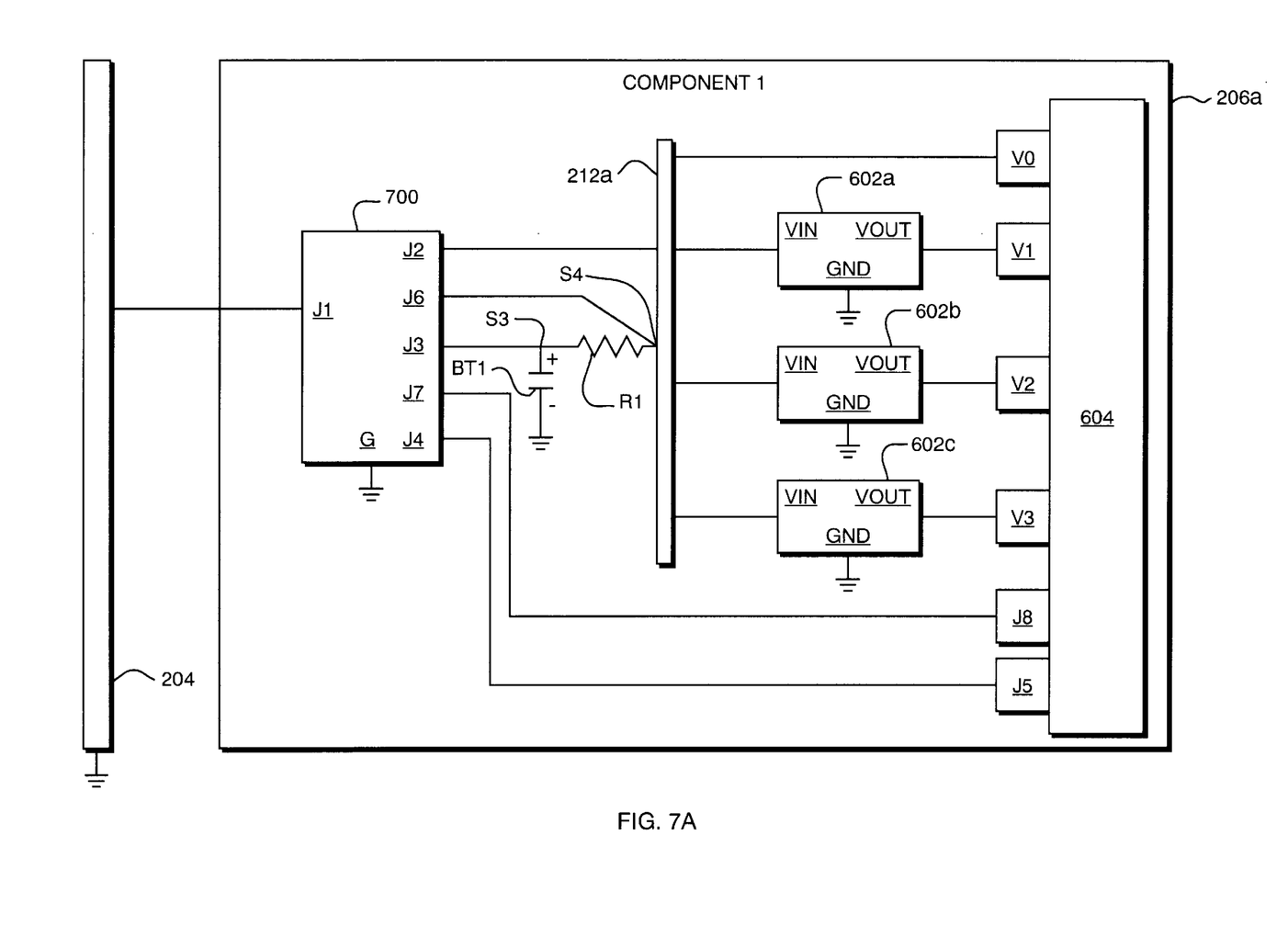
FIG. 7A is a block diagram of a device including a bi-directional power converter that may be used to charge a battery according to one embodiment of the present invention.

Referring to FIG. 7A, in one embodiment of the present invention, a power converter 700 contains battery charge-control functionality, and may be used to charge a battery BT1 that may, for example, provide a source of power to a component of an electrical device. The power converter 700 shown in FIG. 7A is shown in more detail in FIG. 7B, and is the same as the power converter 300 shown on FIG. 6, except for certain specific differences that will be described in more detail below.

Furthermore, the embodiment depicted in FIG. 7A is generally similar to that shown in FIG. 6, except for certain specific differences that will now be described. As shown in FIG. 7A, a battery BT1 and a current sense resistor R1 are coupled in series between the sense input J3 of the power converter 700 and the internal power bus 212a. As will be described in more detail below, the power converter 700 may charge the battery BT1 while power is being drawn from the main power bus 204 in step-down mode. The energy stored in battery BT1 may subsequently be used to provide power to the internal bus 212a if insufficient power is available from the main power bus 204 or if the power converter 700 is operating in step-up mode.

Figure 7B:
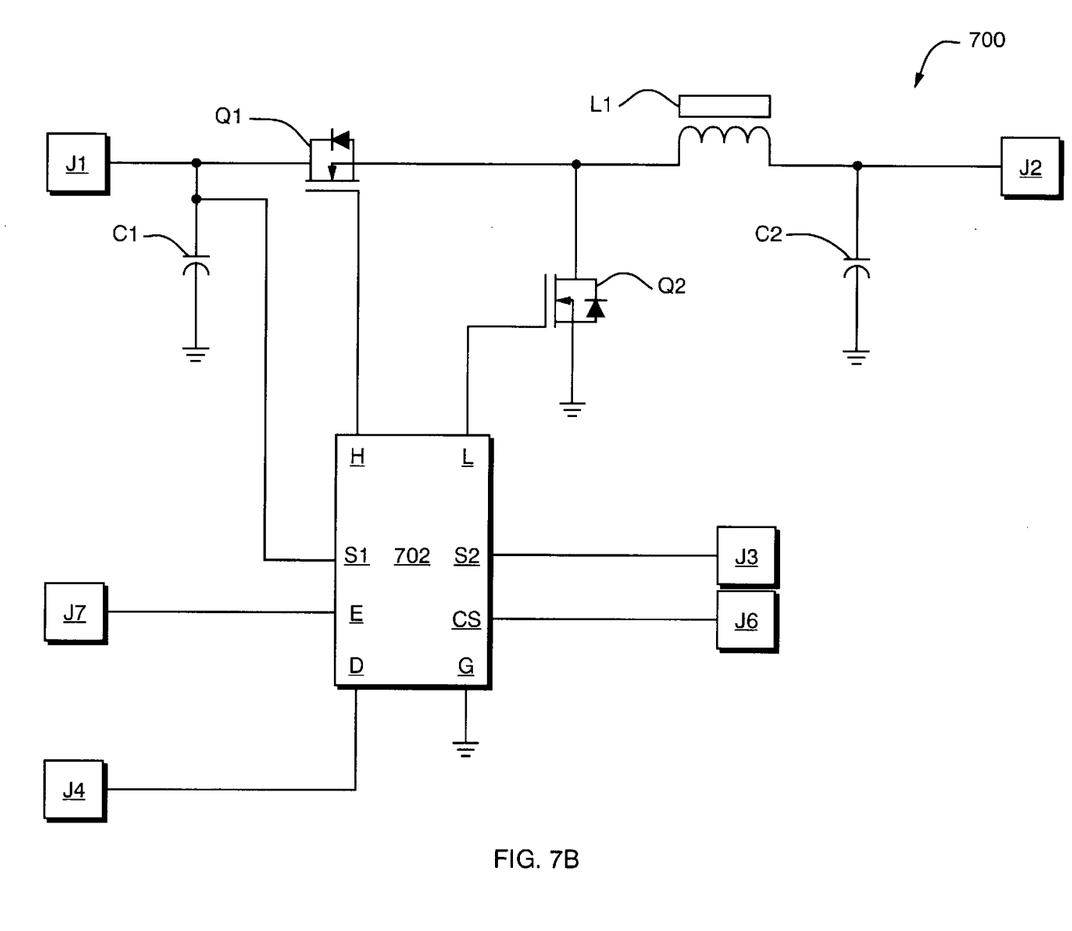
FIG. 7B is a circuit diagram of the bi-directional DC power converter of FIG. 7A according to one embodiment of the present invention.

As shown in FIGS. 7A and 7B, power converter 700 includes two additional sense inputs: J6, which is coupled at node S4 to one side of current sense resistor R1, and J3, which is coupled at node S3 to the other side of current sense resistor R1. Sense inputs J3 and J4 may therefore be used to determine the voltage drop across resistor R1 very precisely and thereby sense the current flowing through resistor R1.

As shown in FIG. 7B, power converter 700 includes a controller 702, which is similar to the controller 302 shown in FIG. 3A, except that sense input S2 of controller 702 is coupled to node J3 and input CS is coupled to node J6.

Operation of the power converter 700 in step-down mode will now be described. If battery BT1 is fully charged, current will flow into power node J1, be stepped-down by the power converter 700, and flow out of power node J2 to the internal power bus 212a. If the battery BT1 is fully charged, the power converter 700 servos to ensure that no current flows through the resistor R1 to the battery BT1. As a result, the power converter 700 will convert power from the main power bus 204 to the internal bus 212a in step-down mode without delivering any power to the battery BT1.

If the controller 702 determines that the battery BT1 requires charging, the controller's behavior will depend on battery chemistry. For example, in the case of a rechargeable lithium battery, the controller 702 will continuously monitor the battery voltage and charging current to determine whether the battery BT1 requires a constant-current or constant-voltage charging scheme (depending on battery impedance and possibly other factors such as elapsed time). If the battery BT1 is determined to require a constant current, the controller 702 monitors the flow of current through the resistor R1 and increases the duty cycle if the current is too low, and decreases the duty cycle if the current is too high. If the battery BT1 is determined to require a constant voltage, the controller 702 monitors the voltage at its S2 input (J3) and increases the duty cycle if the voltage is too low, and decreases the duty cycle if the voltage is too high. When the controller 702 determines that the battery BT1 is fully charged, the charge current is reduced to zero by monitoring the voltage across the resistor R1 and regulating the duty cycle to maintain this voltage equal to zero.

Current does not flow to the battery BT1 while the power converter 700 is operating in step-up mode. Rather, in step-up mode, current flows out of the battery BT1 through resistor R1, onto the internal bus 212a, and into J2. As a result, the energy stored in battery BT1 may be provided both to the internal bus 212a (to provide power to the sub-components 602a–c) and to the main power bus 204 through the power converter 700.

In some cases, depending on battery chemistry and other factors, it could be desirable to interpose an additional transistor switch in series with the resistor R1 in order to electrically isolate the battery BT1 from the internal power bus 212a when the battery BT1 is fully charged. Furthermore, it may be desirable in some cases, especially if said additional transistor is integrated onto the same silicon die as the controller 700, to use the on-resistance of said additional transistor to provide the functionality of the resistor R1, thus obviating the need for resistor R1 and saving both its associated cost and power loss.

It is also possible, using interconnected components having the battery-charging aspect of the present invention, to continuously share battery power among connected components in a special battery-sharing mode. In this mode, the bi-directional power converters in each component maintain a constant duty cycle, which creates a fixed ratio (proportional to the duty cycle) between the voltage of the main power bus 204 and the voltage of the internal power busses of each component. In this mode, if the battery voltage of a given component is higher than the others, the bi-directional power converter for that component may attempt to produce a higher voltage on the main power bus 204 than the bi-directional power converters in the other components, and thus will force current onto the main power bus 204. Correspondingly, the component with the lowest battery voltage will receive the current from the main power bus 204. Thus, whichever battery has the most charge will supply the battery with the least charge, assuming that the batteries use the same chemistry, are at similar temperatures, and have other similar properties.

It should be noted that battery charging embodiments of the present invention may also use the multiphase bi-directional power converter 350 in substantially the same manner as described above with respect to FIG. 3B, provided that the multiphase converter 350 is provided with additional sense inputs of the kind described above, which differentiate the simple bi-directional power converter 300 from the version of the converter 700 intended for battery charging.

Among the advantages of various embodiments of the present invention are one or more of the following.

As should be apparent from the drawings and the description above, various embodiments of the power converter of the present invention may be implemented with a small number of small and inexpensive components that may be interconnected easily due to the efficiency of the design. As a result, various embodiments of the power converter of the present invention may be built quickly, easily, and inexpensively.

A single power converter constructed according to the techniques described herein may be used to replace both a conventional step-up (boost) converter and a conventional step-down (Buck) converter. This single bi-directional power converter may both be smaller and operate more efficiently than the two uni-directional power converters that it replaces.

Furthermore, power converters designed in accordance with the techniques described herein may be calibrated to work with power buses having a variety of power characteristics. As a result, differently-calibrated versions of the bi-directional power converter may be used with devices having different main power buses (e.g., the main power bus 204) and with components having different internal power buses (e.g., the internal power buses 212a–c). In certain embodiments it may be possible to use the power converter with such various power buses simply by re-calibrating the controller 302, without modifying other circuitry of the power converter.

The ease with which various embodiments of the power converter of the present invention may be controlled to operate in either step-up mode or step-down mode facilitates the design of devices (such as the device 200 shown in FIG. 2) in which internal components may either draw power from the device's main power bus or provide power to the device's main power bus at any particular point in time. Such devices may make more efficient use of power by, for example, distributing unused power from one component to another component that is in need of power.

As described above with respect to FIGS. 7A–7B, in one embodiment the power converter 700 may be used to charge a battery. If, for example, the battery is coupled to an internal component of an electrical device, the battery must be used as a source of power to the component in the event that sufficient power is not available from the device's main power bus. In this way, the power converter 700 may serve the dual role of dynamically redistributing power among components in the device on as as-needed basis, as well as providing power to the components in the event that such as-needed redistribution of power is insufficient to meet a particular component's power requirements at a particular point in time.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

For example, the controllers described herein may be any electronic controller suitable for performing the functions described herein. The controllers may, for example, be implemented in hardware (e.g., custom circuitry), software, or any combination thereof.

In some implementations, it may be desirable to place a Schottky diode across switch Q2. If switch Q2, or the inherent reverse diode contained within, Q2, is too slow, the inclusion of such a Schottky diode may increase the efficiency of operation.

Although the inductor L1 may be chosen using numerous methods, it is important that it be chosen to withstand the maximum peak and average currents that would be encountered by the inductor L1 while the corresponding power converter is operating in both step-down mode and step-up modes.

The capacitors C1 and C2 and the inductor L1 are preferably, but not necessarily, selected such that they satisfy the minimum criteria for operation of the corresponding power converter in both step-down mode and step-up mode. Appropriate choice of capacitor C2 is more important when the power converter operates in step-down mode, and appropriate choice of capacitor C1 is more important when the power converter operates in step-up mode.

One way in which capacitors C1 and C2 may be chosen is as follows. A first design of the power converter circuitry (such as the circuitry shown in FIG. 3) may be generated in which components of the circuitry are chosen to optimize the design for operation in step-down mode. A second design of the power converter circuitry may then be generated in which components of the circuitry are chosen to optimize the design for operation in step-up mode. Of the two capacitors C1 (one in the first design and one in the second design), the capacitor C1 having the highest capacitance may be selected for the final design. Similarly, of the two capacitors C2, the capacitor C2 having the highest capacitance may be selected for the final design.

Elements and components described herein may be further divided into additional components or joined together to form fewer components for performing the same functions. The techniques described above may be implemented, for example, in hardware, software, firmware, or any combination thereof. The techniques described above may be implemented in one or more computer programs executing on a programmable computer including a processor, a storage medium readable by the processor Any of the foregoing may be supplemented by, or incorporated in, specially-designed ASICs (application-specific integrated circuits).

What is claimed is:

1. A bi-directional DC-to-DC power converter comprising:

a circuit comprising a first power node, a second power node, and an internal node;

first energy storage means coupled between the first power node and ground;

second energy storage means coupled between the second power node and ground;

a first switch coupled between the first power node and the internal node, wherein the first switch permits current flow between the first node and the internal node when in a closed position;

a second switch coupled between the internal node and ground, wherein the second switch permits current flow between the internal node and ground when in a closed position;

inductive means coupled between the second power node and the internal node;

a duty-cycle controller coupled to the first and second switches and to first and second control signals, said controller comprising:
  first sensing means for sensing a first voltage, the first sensing means comprising a first voltage-sensing input coupled to the first power node;
  second sensing means for sensing a second voltage, the second sensing means comprising a second voltage-sensing input coupled to the second power node;
  sense-selection means for alternately selecting the first and second voltage sensing inputs;
  a pulse generator which controls the first and second switches; and
  feedback means for controlling the pulse generator in response to input received from the one of the first and second voltage-sensing inputs that is selected by the sense-selection means.

2. The power converter of claim 1, wherein the first power node is coupled to a first power bus, and wherein the second power node is coupled to a second power bus, and wherein the power converter further comprises:
  a sense resistor having a first end coupled to the second power bus and a second end;
  a battery coupled between ground and the second end of the sense resistor, thereby forming a junction;
  a current-sense input coupled to the junction formed by the battery and the current sense resistor;
  first and second connections where the second voltage-sense input and the current-sense input, respectively, connect to the sense resistor such that the voltage between the second voltage-sense input and the current-sense input corresponds to the current through the sense resistor;
  current sense means coupled between the second voltage-sense input and the current-sense input for sensing a current through the sense resistor and producing as an output a proxy for the current;
  a battery charge controller for determining the amount of current to flow into the battery;
  and wherein the feedback means comprises an expanded selection means comprising an input selectable among:
    (1) the first voltage;
    (2) the second voltage; and
    (3) the output of the current sense means.

3. The power converter of claim 1, wherein the battery comprises an integral safety circuit for automatically disconnecting the battery in response to a signal from the battery charge controller.

4. A method for use by a bi-directional DC-to-DC power converter having both step-down and step-up modes of operation, the power converter comprising a first power node, a second power node, first sensing means for sensing a first voltage at the first power node, second sensing means for sensing a second voltage at the second power node, and a pulse generator having a duty cycle, the method comprising steps of:
  (A) selecting one of the step-up and step-down modes of operation;
  (B) when the step-down mode is selected, performing steps of:
    (B)(1) selecting the second voltage; and
    (B)(2) converting power from the first power node to the second power node by maintaining a first feedback loop that varies the duty cycle of the pulse generator to maintain the second voltage at a first constant level;
  (C) when the step-up mode is selected, performing steps of:
    (C)(1) selecting the first voltage; and
    (C)(2) converting power from the second power node to the first power node by maintaining a second feedback loop that varies the duty cycle of the pulse generator to maintain the first voltage at a second constant level.

5. A method for use by the power converter of claim 2, wherein the power converter has both step-up and step-down modes of operation, the method comprising steps of:
  (A) selecting one of the step-up and step-down modes of operation;
  (B) when the step-down mode of operation is selected, performing a step of determining whether the battery is to be charged in a constant-current mode;
  (C) if it is determined in step (B) that the battery is to be charged in the constant-current mode, performing steps of:
    (C)(1) selecting the current sense means;
    (C)(2) converting power from the first power node to the second power node by maintaining a first feedback loop that varies the duty cycle of the pulse generator to maintain the sensed current at a first constant level and to deliver power to the battery through the sense resistor;
  (D) when the step-up mode of operation is selected, performing steps of:
    (D)(1) selecting the first voltage; and
    (D)(2) converting battery power from the second power node to the first power node by maintaining a second feedback loop that varies the duty cycle of the pulse generator to maintain the first voltage at a second constant level.

6. The method of claim 5, wherein the step (B) further comprises a step of determining whether the battery is not to be charged, and wherein the method further comprises a step of:
  (E) if it is determined in step (B) that the battery is not to be charged, performing steps of:
    (E)(1) selecting the current sense means; and
    (E)(2) converting power from the first power node to the second power node by maintaining a third feedback loop that varies the duty cycle of the pulse generator to maintain the sensed current at zero and without delivering power to the battery.

7. The method of claim 5, wherein the step (B) further comprises a step of determining whether the battery is not to be charged, and wherein the method further comprises a step of:
  (E) if it is determined in step (B) that the battery is not to be charged, performing steps of:
    (E)(1) selecting the second voltage sense means;
    (E)(2) maintaining the battery in a disconnected state; and
    (E)(3) converting power from the first power node to the second power node by maintaining a third feedback loop that varies the duty cycle of the pulse generator to maintain the second voltage at a third constant level.

8. The method of claim 5, wherein the step (B) further comprises a step of determining whether the battery is to be charged in a constant voltage mode, and wherein the method further comprises a step of:
  (E) if it is determined in step (B) that the battery is to be charged in the constant voltage mode, performing steps of:

(E)(1) selecting the second sensing means; and
(E)(2) converting power from the first power node to the second power node by maintaining a second feedback loop that varies the duty cycle of the pulse generator to maintain the second voltage at a constant charging voltage.

9. A method for use by the power converter of claim 2, wherein the power converter has both step-up and step-down modes of operation, the method comprising steps of:

(A) selecting one of the step-up and step-down modes of operation;

(B) when the step-down mode of operation is selected, performing a step of determining whether the battery is to be charged in a constant voltage mode;

(C) if it is determined in step (B) that the battery is to be charged in the constant voltage mode, performing steps of:
   (C)(1) selecting the second sensing means; and
   (C)(2) converting power from the first power node to the second power node by maintaining a first feedback loop that varies the duty cycle of the pulse generator to maintain the second voltage at a constant charging voltage;

(D) when the step-up mode of operation is selected, performing steps of:
   (D)(1) selecting the first voltage; and
   (D)(2) converting battery power from the second power node to the first power node by maintaining a second feedback loop that varies the duty cycle of the pulse generator to maintain the first voltage at a first constant level.

10. The method of claim 9, wherein the step (B) further comprises a step of determining whether the battery is not to be charged, and wherein the method further comprises a step of:

(E) if it is determined in step (B) that the battery is not to be charged, performing steps of:
   (E)(1) selecting the current sense means; and
   (E)(2) converting power from the first power node to the second power node by maintaining a third feedback loop that varies the duty cycle of the pulse generator to maintain the sensed current at zero and without delivering power to the battery.

11. The method of claim 9, wherein the step (B) further comprises a step of determining whether the battery is not to be charged, and wherein the method further comprises a step of:

(E) if it is determined in step (B) that the battery is not to be charged, performing steps of:
   (E)(1) selecting the second voltage sense means;
   (E)(2) maintaining the battery in a disconnected state; and
   (E)(3) converting power from the first power node to the second power node by maintaining a third feedback loop that varies the duty cycle of the pulse generator to maintain the second voltage at a second constant level.

* * * * *